April 7, 1953        E. TUREK        2,634,004

DISCHARGE GUIDE FOR CORN ELEVATORS

Filed March 26, 1951        2 SHEETS—SHEET 1

Inventor
EMIL TUREK
By Arthur H. Sturges
Attorney

April 7, 1953  E. TUREK  2,634,004
DISCHARGE GUIDE FOR CORN ELEVATORS
Filed March 26, 1951  2 SHEETS—SHEET 2
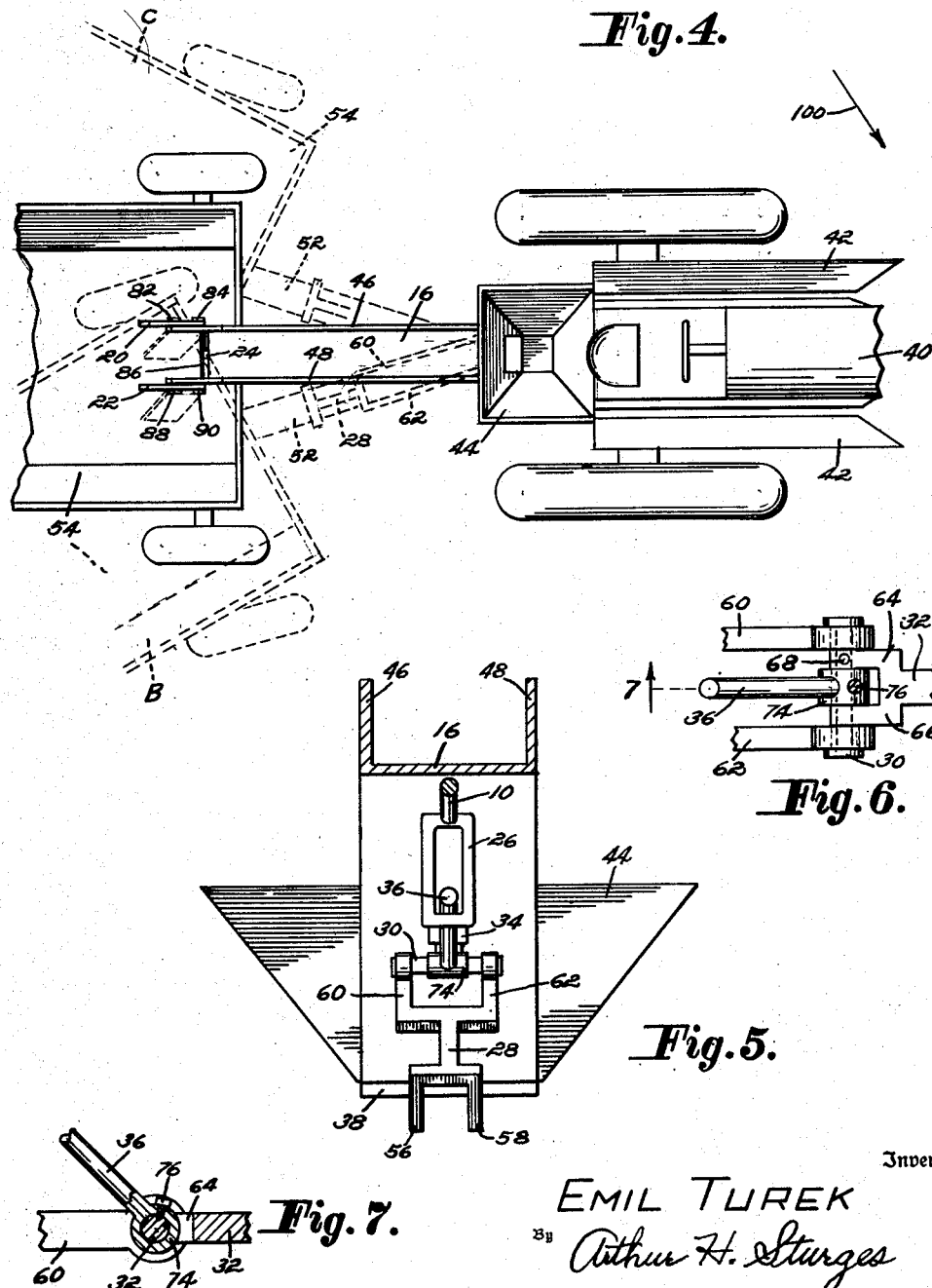
Inventor
EMIL TUREK
By Arthur H. Sturges
Attorney Patented Apr. 7, 1953

2,634,004

UNITED STATES PATENT OFFICE 2,634,004

DISCHARGE GUIDE FOR CORN ELEVATORS

Emil Turek, Milligan, Nebr.

Application March 26, 1951, Serial No. 217,429

3 Claims. (Cl. 214—42)

This invention relates to farm implements and particularly harvesting machinery where crops, such as corn and the like, are taken from the field and deposited into wagons, trucks and the like, and in particular this invention relates to an attachment for an elevator for delivering corn from a corn picker to a wagon where in turning corners the upper end of the elevator swings to the side of the wagon, the attachment providing means for deflecting the corn from a passage where it may drop on the ground beside the wagon to the interior of the wagon.

The purpose of this invention is to prevent the usual waste of farm produce where in turning corners and the like an elevator delivering products from a picker or the like drops the produce upon the ground from which only partial recovery thereof is possible.

In contour farming where fields are plowed in furrows so that water is trapped in the furrows for supplying moisture to the roots of crops, particularly on the sides of hills, the furrows follow the contour of the land and are not usually straight. For the most efficient farming the furrows sometimes form the letter C and sometimes the letter S. By this means the earth is not washed away and the moisture is retained in the ground a longer period of time.

In harvesting crops from arcuate furrows in fields of this type grain is lost by being dropped upon the ground from the delivery ends of elevators which swing to the sides of wagons and trucks, and once the grain is dropped on the ground recovery thereof is very difficult.

With this thought in mind this invention contemplates an attachment for elevators for this use whereby grain dropped from the upper ends of elevators extended beyond the sides of a wagon is deflected into the body of the wagon.

The object of this invention is, therefore, to provide means for forming an attachment for elevators delivering products from pickers or the like to wagons whereby products dropped from the elevators are automatically deflected into the body of the wagon even though the upper end of the elevator may extend beyond one of the sides of the wagon.

Another object of the invention is to provide deflecting means for the upper ends of elevators for delivering farm products from pickers and harvesters to carrying vehicles in which the deflecting means may be adjusted from the lower ends of the elevators.

A further object of the invention is to provide deflecting or guide plates for the upper ends of elevators used for delivering farm products from harvesters to wagons, which may also be attached to other equipment and used for other purposes.

A still further object of the invention is to provide deflecting plates for the upper end of an elevator for delivering farm products from a harvester to a wagon which provide an attachment that is of a simple and economical construction.

With these and other objects and advantages in view the invention embodies a shaft journaled on the under side of an inclined elevator carried by a harvester and in which the harvester is adapted to be connected to the tongue of a wagon, and deflecting plates depending from the upper end of the elevator and connected to the upper end of the shaft, and means actuated by the tongue of a wagon connected to the harvester for rotating the shaft to actuate the deflecting plates.

Other features and advantages of the invention will appear from the following description taken in connection with the drawings, wherein:

Figure 4 is a plan view showing the elevator positioned between the rear part of a tractor and the front of a wagon, and illustrating the wagon in laterally extended positions in dotted lines.

Figure 5 is a cross section through the elevator taken on line 5—5 of Figure 2 showing the instrumentalities for connecting the attachment to the tongue of a wagon.

Figure 6 is a detail showing a plan view of a stub shaft with the ends of levers and yokes mounted thereon.

Figure 7 is a longitudinal section taken on line 7—7 of Figure 6 and also showing the stub shaft and the levers and yokes mounted thereon.

Figure 1:
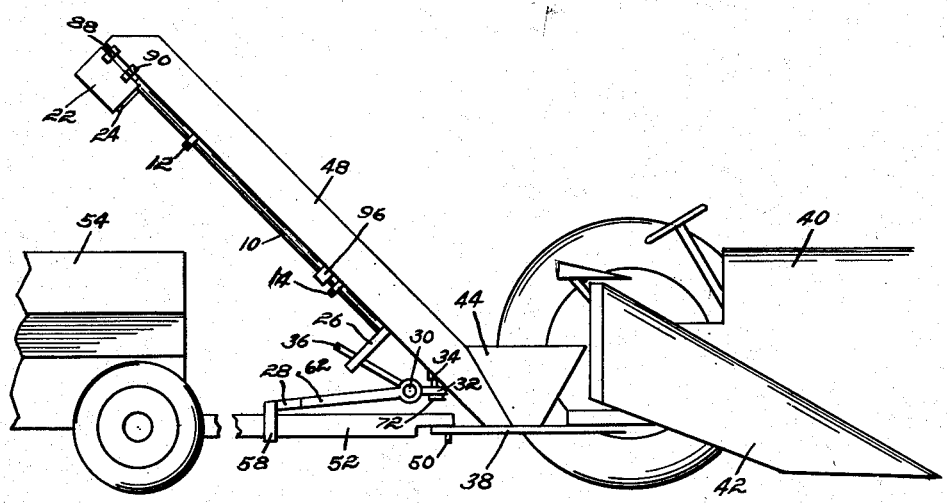
Figure 1 is a side elevational view illustrating the attachment mounted on an elevator carried by a corn picker on a tractor, and showing the tractor connected to the tongue of a wagon.
Figure 2:
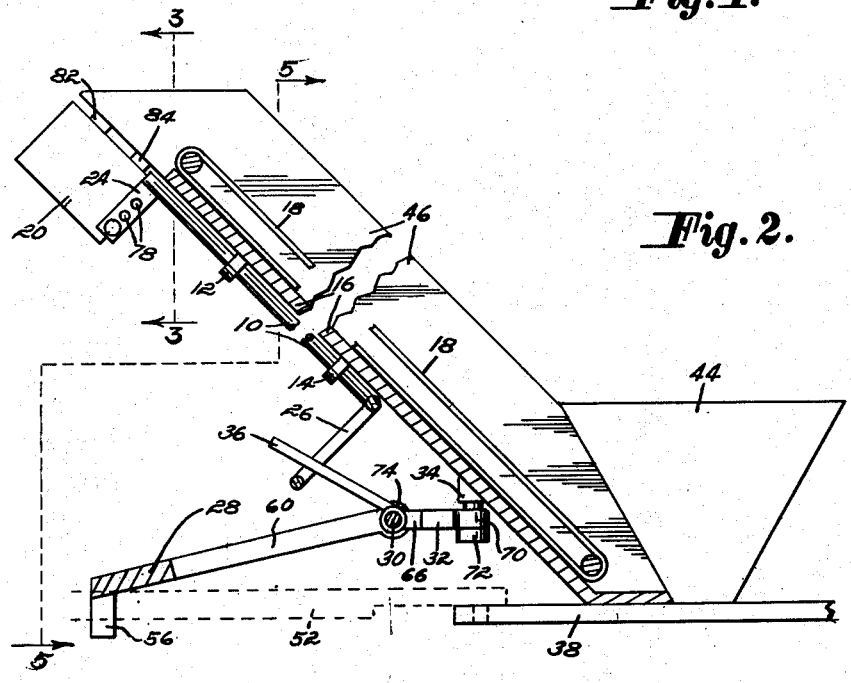
Figure 2 is a vertical longitudinal section through the elevator showing the attachment thereon and with parts broken away and other parts omitted.

Referring now to the drawings wherein like reference characters denote corresponding parts the farm product delivery elevator attachment of this invention includes a shaft 10 journaled by bearings 12 and 14 on the base 16 of an elevator having an endless belt 18, deflector plates 20 and 22 hinged to the sides of the upper end of the elevator and actuated by an arm 24 on the upper end of the shaft, a closed yoke 26 carried by the lower end of the shaft, a lever 28 having bifurcated ends, a stub shaft 30 on which one end of the lever 26 is pivotally mounted, a fork 32 by which the stub shaft and lever are supported from the elevator through a pin 34, and a finger 36 also mounted on the stub shaft 30 and positioned to extend through the closed yoke 26.

The elevator on which the attachment of this invention is illustrated is mounted on a platform 38 carried by a tractor 40 and the tractor is provided with conventional corn picker elements as indicated by the numeral 42. The elevator extends from a hopper 44 and the base 16 with the side panels 46 and 48 are inclined upwardly from the platform 38, the end of which is provided with an opening for receiving a pin 50 of a tongue 52, extended from a wagon 54.

The bifurcated extended end of the lever 28 is provided with depending fingers 56 and 58 which extend over the tongue 52, and the opposite end is provided with arms 60 and 62 which are pivotally mounted on the ends of the stub shaft 30. The stub shaft is mounted in the arms 64 and 66 on the end of the fork 32, and a pin 68 which extends through the arm 64 and shaft retains the shaft in a stationary position. The fork 32 is provided with a hub 70 that is pivotally mounted on the pin 34, and the hub is secured on the pin by a nut 72. The finger 36, which extends into the closed yoke 26 is also provided with a hub, as indicated by the numeral 74, and the finger is secured in position on the shaft by a pin 76 which extends through the hub 74 and shaft.

Figure 3:
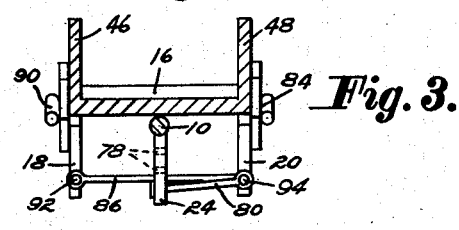
Figure 3 is a cross section through the upper end of the elevator taken on line 3—3 of Figure 2.

The arm 24 on the upper end of the shaft 10 is provided with a plurality of spaced openings 78, and as illustrated in Figure 3, a link 80 connects the arm to the deflecting plate 20 which is hinged by hinges 82 and 84 to the upper end of the elevator, and the deflecting plate 20 is connected to the deflecting plate 22 by a rod 86. The plate 22 is hinged to the elevator by hinges 88 and 90, and the rod 86 which is connected to the plate 22 by a pin 92, is connected to the plate 20 by a pin 94 to which the link 80 is also connected. The opposite end of the link 80 is adapted to be connected to the arm 24 through the different openings 78 depending upon the distance it is desired to move the deflecting plates 20 and 22.

The elevator is provided with an eye 96 which is used for retaining the lever 28 in an upwardly extended position when the corn picker or harvester is separated from the wagon. The lever may be attached to the eye by a wire or cord as may be desired, and it will be understood that other means may be used for retaining the lever in an upwardly extended position.

With the parts arranged as shown and described it will be seen that as the tractor turns in the direction of the arrow 100 the wagon will assume the position indicated by the dotted lines B and the deflecting plates 20 and 22 will be inclined as shown in dotted lines in Figure 4. By the same means the wagon will be in the position indicated by the dotted lines C when the wagon turns in the opposite direction and the deflector plates will slope accordingly, whereby corn and other products dropping from the upper end of the elevator will be directed into the body of the wagon even though the upper end of the elevator may extend over the side of the wagon.

From the foregoing description it is thought to be obvious that an attachment for automatically deflecting products from elevators for loading wagons in harvesting constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be undertsood as limiting myself to the precise arrangement and formation of the several parts herein shown in carrying out my invention in practice except as claimed.

Having thus fully described the invention what I claim as new and desire to secure by Letters Patent, is:

1. In an attachment for deflecting farm products from an elevator into a wagon, the combination which comprises, a harvester having a platform, an inclined elevator carried by the platform of the harvester, a wagon having a tongue pivotally attached to the platform of the harvester, deflecting plates hinged to the sides of the elevator and depending from the upper end thereof, a shaft journaled on the elevator and having an arm on the upper end and a closed yoke extended from the lower end, a lever having spaced depending fingers on an extended end, means pivotally mounting the lever on the elevator with the said fingers straddling the tongue of the wagon, a finger carried by the lever and extended through the yoke of the shaft for actuating the shaft by the lever, and means actuated by the arm on the upper end of the shaft for actuating the said deflecting plates.

2. In an attachment for deflecting farm products from an elevator into a wagon, the combination which comprises a harvester having a platform, an inclined elevator carried by the platform of the harvester, a wagon having a tongue positioned to follow the harvester and pivotally attached to the said platform thereof, deflecting plates hinged to the sides of the elevator and depending from the upper end thereof, a shaft having an arm on the upper end and a closed yoke on the lower end journaled on the elevator, means adjustably connecting the arm on the upper end of the shaft to one of the said deflecting plates, means connecting the deflecting plates together, a fork pivotally mounted on the lower part of the elevator and positioned to swing laterally, a lever pivotally mounted in the extended end of the fork and positioned to swing vertically, said lever having depending fingers thereon spaced to straddle the tongue of the wagon, and a finger extended upwardly from the connection between the fork and lever and extended through the said closed yoke.

3. In an attachment for deflecting farm products from an elevator into a wagon, the combination which comprises a harvester, a wagon having a tongue, means pivotally connecting the extended end of the tongue to the harvester, an elevator extended diagonally upward from said harvester and positioned with the upper end adapted to extend over the wagon, depending plates hinged to the sides of the upper end of the elevator, a shaft journaled on the under side of the elevator and extended longitudinally thereof, said shaft having an arm extended from the upper end, means connecting the arm to said deflecting plates for actuating the plates with the shaft, a lever pivotally mounted on the lower part of the elevator, means actuated by the tongue of the wagon for turning said lever laterally as the harvester turns in relation to the wagon, and means actuating said shaft by the lever whereby the shaft actuates the deflecting plates to correspond with the position of the wagon.

EMIL TUREK.

REFERENCES CITED

The following references are of record in the file of this patent:

UNITED STATES PATENTS

| Number | Name | Date |
|---|---|---|
| 1,798,231 | Thiemann | Mar. 31, 1931 |
| 2,377,760 | Court | June 5, 1945 |